United States Patent
Katogi et al.

(10) Patent No.: US 7,380,797 B2
(45) Date of Patent: Jun. 3, 2008

(54) WHEEL SUPPORT BEARING ASSEMBLY

(75) Inventors: Sadaji Katogi, Iwata (JP); Kazunari Yamamoto, Iwata (JP); Hiedeo Shinagawa, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/621,404

(22) Filed: Jul. 18, 2003

(65) Prior Publication Data

US 2004/0017048 A1    Jan. 29, 2004

(30) Foreign Application Priority Data

Jul. 29, 2002    (JP) .............................. 2002-219426

(51) Int. Cl.
F16J 15/32    (2006.01)
F16C 33/76    (2006.01)
F16C 33/80    (2006.01)

(52) U.S. Cl. ...................... 277/351; 277/562; 277/566; 277/552; 277/559; 384/480; 384/486; 384/488

(58) Field of Classification Search ................ 277/351, 277/562, 565, 566, 552, 559; 384/480, 486, 384/488, 379
See application file for complete search history.

(56) References Cited

U.S. PATENT DOCUMENTS 4,399,998 A * 8/1983 Otto ............................ 277/552

(Continued)

FOREIGN PATENT DOCUMENTS

EP    1 177 959    2/2002

(Continued)

OTHER PUBLICATIONS

European Search Report for Application No. 03015961.0.

(Continued)

*Primary Examiner*—Alison K Pickard

(57) ABSTRACT

To provide a wheel support bearing assembly in which the frictional resistance can be effectively reduced while effects of minimizing leakage of the filled lubricant and ingress of dust and muddy water from outside of the bearing assembly are secured, the wheel support bearing assembly includes an outer member 1, an inner member 2 positioned inside the outer member 1 with an annular working space defined between it and the outer member 1, and rows of rolling elements 3 accommodated within the annular working space and rollingly received in part within outer raceways 4 in the outer member 1 and in part within inner raceways 5 in the inner member 2. Opposite open ends of the annular working space are sealed by respective sealing members 7 and 8 which are secured to one of the outer and inner members 1 and 2. Each of those sealing members 7 an 8 has a plurality of elastic sealing lips 10*a* to 10*c* or 12*a* to 12*c* having their free ends oriented towards associated sealing surfaces 2*c* defined on the other of the outer and inner members 1 and 2, or 15*aa* and 15*ba* defined on a sealing contact member 15 secured to the other of the outer and inner members 1 and 2. Of those elastic sealing lips, the axially innermost sealing lips 10*a* and 12*a* function as a non-contact sealing lip that defines a respective gap of a size δ1 and δ2 sufficient to provide a non-contact sealing effect. The remaining sealing lips 10*b*, 10*c*, 12*b* and 12*c* function as a contact sealing lip.

9 Claims, 8 Drawing Sheets

U.S. PATENT DOCUMENTS

| | | | | |
|---|---|---|---|---|
| 4,556,225 | A | * | 12/1985 | Drygalski et al. .......... 277/559 |
| 4,695,062 | A | * | 9/1987 | Dreschmann et al. ....... 277/353 |
| 4,770,548 | A | * | 9/1988 | Otto ........................... 384/478 |
| 4,772,138 | A | * | 9/1988 | Dreschmann et al. ....... 384/488 |
| 4,799,808 | A | | 1/1989 | Otto |
| 4,865,471 | A | * | 9/1989 | Miyazaki .................... 384/482 |
| 5,042,822 | A | * | 8/1991 | Dreschmann et al. ....... 277/353 |
| 5,129,744 | A | * | 7/1992 | Otto et al. ................... 384/486 |
| 5,553,870 | A | * | 9/1996 | Czekansky et al. ......... 277/559 |
| 5,860,748 | A | * | 1/1999 | Okumura et al. ........... 384/486 |
| 5,895,052 | A | * | 4/1999 | Drucktenhengst et al. .. 277/351 |
| 6,045,133 | A | * | 4/2000 | Lannert et al. ............. 277/321 |
| RE36,804 | E | * | 8/2000 | Kajihara et al. ............ 384/480 |
| 6,168,315 | B1 | * | 1/2001 | Nagase et al. .............. 384/448 |
| 6,206,380 | B1 | | 3/2001 | Miyazaki |
| 6,241,396 | B1 | * | 6/2001 | Shimomura et al. ........ 384/477 |
| 6,585,420 | B2 | | 7/2003 | Okada |

FOREIGN PATENT DOCUMENTS

| | | |
|---|---|---|
| JP | 01-169176 | 7/1989 |
| JP | 10-252762 | 9/1998 |
| JP | 2001-289257 | 10/2001 |
| JP | 2003-222145 | 8/2003 |

OTHER PUBLICATIONS

Preliminary Notice of Rejection issued Sep. 18, 2007 in the corresponding Japanese Patent Application No. 2002-219426 (3 pages).

* cited by examiner

WHEEL SUPPORT BEARING ASSEMBLY

BACKGROUND OF THE INVENTION

1. Field of the Invention

The present invention generally relates to a wheel support bearing assembly for use in the field of automotive vehicles and, more particularly, to the sealing structure in the wheel support bearing assembly.

2. Description of the Related Art

In general, wheel support bearing assemblies used in, for example, automotive vehicles are used or operated under harsh environments as they are often exposed to rugged and/or wet road surfaces. Therefore, the wheel support bearing assemblies are required to have a relatively high effect of avoiding an undesirable intrusion of dust and muddy water from outside of an automotive vehicle and, also, a relatively high capability of avoiding an undesirable leakage of a grease used as a lubricant.

In view of the foregoing, such a sealing structure as shown in FIGS. 12 and 13A and 13B, for example, has been employed. The wheel support bearing assembly utilizing the sealing structure shown in FIGS. 12 and 13A and 13B includes a generally cylindrical inner member 32, a generally cylindrical outer member 31 positioned radially outwardly of the inner member 32 with an annular working space or a bearing space defined between it and the inner member 32, and a plurality of, for example, two, circumferentially extending rows of rolling elements 33 operatively accommodated within the annular working space and rollingly engaged in part in inner raceways 35 defined in an outer peripheral surface of the inner member 32 and in part in outer raceways 34 defined in an inner peripheral surface of the outer member 31. The annular working space delimited between the inner and outer members 32 and 31 has its opposite, outboard and inboard open ends sealed respectively by outboard and inboard sealing members 37 and 38 each having one or more elastic sealing lips.

An outboard portion of the wheel support bearing assembly, which is encompassed by the circle E in FIG. 12, is shown in FIG. 13A on an enlarged scale. The outboard sealing member 37 is of a structure including an elastic member 40 fitted to a core meal 39. This elastic member 40 is made up of three elastic sealing lips 40a, 40b and 40c slidably engageable with a seal contact surface 32c defined in an outboard portion of the outer peripheral surface of the inner member 32. Of those elastic sealing lips, the elastic sealing lip 40a is utilized to prevent a grease, filled in the annular working space, from leaking and is so tailored as to extend generally axially inwardly of the annular working space in a direction towards the inboard side. The remaining elastic sealing lips 40b and 40c are utilized to avoid an undesirable ingress of dust and muddy water from outside of the annular working space.

Similarly, an inboard portion of the wheel support bearing assembly, which is encompassed by the circle F in FIG. 12, is shown in FIG. 13B on an enlarged scale. The inboard sealing member 38 is of a structure including an elastic member 42 fitted to a core metal 41. The elastic member 42 has three elastic sealing lips 42a, 42b and 42c slidingly engageable with a seal contact member 45 fixedly mounted on the outer peripheral surface of the inner member 32. Of those elastic sealing lips, the elastic sealing lip 42a is utilized to prevent the grease, filled in the annular working space, from leaking and is so tailored as to extend generally axially inwardly of the annular working. The remaining elastic sealing lips 42b and 42c are utilized to avoid an undesirable ingress of dust and muddy water from outside of the annular working space. It is to be noted that the seal contact member 45 referred to above serves as a slinger.

The wheel support bearing assembly utilizing the sealing structure shown in and described with reference to FIGS. 12 and 13A and 13B makes use of the outer board and inboard sealing members 37 and 38 each including the slidably contacting elastic sealing lips 40a to 40c and 42a to 42c. Accordingly, the sealing structure is effective to provide a satisfactory sealing performance.

Since however, the outboard and inboard sealing members 37 and 38 are a contact seal in which the elastic sealing lips 40a to 40c and 42a to 42c slidingly contact the outboard portion of the outer peripheral surface of the inner member 32 and the seal contact member 45, respectively, a high frictional resistance is involved in the seal contact regions. Also, the sealing members 37 and 38 tend to cause a phenomenon that when air confined within the annular working space expands thermally as a result of generation of heat during the operation of the wheel support bearing assembly, that is, during rotation of one of the outer and inner members 31 and 32 relative to the other of the outer and inner members 31 and 32, the elastic sealing lips 40a and 42a that are positioned axially inwardly of the annular working space are forced to contact the respective sliding surfaces, that is, the outboard portion of the outer peripheral surface of the inner member 32 and the seal contact member 45. Once this phenomenon occurs, respective contact pressures between the elastic sealing lips 40a and 42a and the associated sliding surfaces increase, which in turn result in increase of frictional resistance.

When it comes to automotive vehicles, a demand for realization of a high mileage is increasing and, for this reason, various attempts have hitherto been endorsed. For example, so far as the wheel support bearing assembly is concerned, weight saving of the bearing assembly itself and reduction in frictional resistance occurring in moving components are called for. One of major causes of the increased frictional resistance in the bearing assembly includes preload and seal torque, and the torque brought about by the contact seal discussed above largely affects the frictional resistance occurring in the wheel support bearing assembly.

SUMMARY OF THE INVENTION

The present invention has for its primary object to provide a wheel support bearing assembly in which frictional resistance can be effectively reduced while effects of minimizing leakage of a filled lubricant and ingress of dust and muddy water from outside of the bearing assembly are secured.

In order to accomplish this object of the present invention, there is provided a wheel support bearing assembly which includes an outer member having an inner peripheral surface formed with a plurality of outer raceways; an inner member positioned inside the outer member with an annular working space defined between it and the outer member, and having an outer peripheral surface formed with inner raceways in mating relation with the respective outer raceways in the outer member; and rows of rolling elements accommodated within the annular working space and rollingly received in part within the outer raceways in the outer member and in part within the inner raceways in the inner member. At least one sealing member is fitted to one of the inner and outer members for sealing one of opposite open ends of the annular working space delimited between the inner and outer members. This sealing member has a plurality of elastic sealing lips which extend towards a sealing surface defined directly on the other of the inner and outer members or defined on a sealing contact member fitted to the other of the inner and outer members. One of said elastic sealing lips extends in a direction generally axially inwardly of the annular working space and defining an axially innermost sealing lip.

While the remaining elastic sealing lips other than the axially innermost sealing lip are held in sliding contact with the sealing surface, the axially innermost sealing lip is a non-contact sealing lip leaving a gap between a free end thereof and the sealing surface of the sealing contact member. This gap is of a size sufficient to permit flow of air therethrough and also to provide a non-contact sealing effect when a relative rotation takes place between the outer and inner members.

According to the present invention, since the axially innermost sealing lip functions as the non-contact sealing lip, no frictional resistance occurs and, accordingly, any possible occurrence of a loss of torque brought about by the seal can advantageously be eliminated. Although the axially innermost sealing lip which serves to prevent a lubricant, filled in the annular working space, from leaking to the outside functions as the non-contact elastic sealing lip, if the gap is of a small size to a certain extent, yet it can prevent the viscous lubricant such as a grease from leaking through such gap and, thus, the axially innermost elastic sealing lip can provide a function of avoiding an undesirable leakage of the lubricant.

In addition, since the axially innermost elastic sealing lip functions as the non-contact elastic sealing lip, air inside the annular working space can be purged to the outside through the gap even when thermally expanded by the effect of heat evolved during the operation of the wheel support bearing assembly. Accordingly, there is no possibility that the axially innermost elastic sealing lip may be urged to contact the sealing surface by the effect of the pressure of air so expanded thermally and, hence, no increase of the frictional resistance takes place in anyway whatsoever, with the loss of torque minimized correspondingly. With respect to an undesirable ingress of dust and muddy water from the outside into the annular working space, the other contact-type elastic sealing lips can serve the purpose.

In a preferred embodiment of the present invention, the sealing member includes a core metal and an elastic member rigidly mounted on the core metal and wherein all of the elastic sealing lips are an integral part of the elastic member.

While concurrent use of the contact sealing lips and the non-contact sealing lip is made in the present invention, those contact and non-contact sealing lips are all formed in the elastic member and, accordingly, an effect of reducing the frictional resistance can be secured without the number of component parts being increased. Also, since the axially innermost sealing lip is an integral part of the elastic member rigidly mounted on the core metal, the gap between the free end of the axially innermost sealing lip and the sealing surface can be precisely controlled easily.

The gap is preferably defined in a radial direction between the free end face of the axially innermost sealing lip and the sealing surface confronting the free end. The presence of the gap in the radial direction is effective in that, unlike a sealing structure in which a gap is formed in an axial direction, the outer peripheral surface of the inner member or the inner peripheral surface of the outer member can be utilized as the sealing surface with which the sealing lips confront. Accordingly, neither addition of any element for the formation of a non-contact sealing gap nor a machining process for machining a collar is needed in the practice of the present invention.

Also, the free end of the axially innermost sealing lip may extend in a direction inwardly of the annular working space between the inner and outer members. If the axially innermost sealing lip held in non-contact relation with the sealing surface as discussed above is designed to extend inwardly of the annular working space, a proper spacing can easily be secured among the sealing lips and increase in sealability can be expected.

In another preferred embodiment of the present invention, a free end face of the axially innermost sealing lip which confronts the sealing surface has a width, as measured in a direction across a thickness of the axially innermost sealing lip, which is greater than that of any one of the remaining elastic sealing lips. Since the axially innermost sealing lip functions as the non-contact sealing lip and does in no way affect any increase of the frictional resistance, the width of the free end face of the axially innermost sealing lip can be chosen to be large as desired so that the sealing effect can be increased. It is to be noted that the width of "any one of the remaining elastic sealing lips" referred to above is the width of a portion of any one of the remaining elastic sealing lips that is held in sliding contact with the sealing surface.

The free end face of the axially innermost sealing lip is preferably grooved in a direction circumferentially of the axially innermost sealing lip. Where the free end face of the axially innermost sealing is grooved, the gap between it and the sealing surface can defines a labyrinth seal structure with the sealability increased consequently. Also, where the plural grooves are employed on the free end face of the axially innermost sealing lip, such gap can provide a more complicated labyrinth seal structure with the sealability further increased consequently. Since as discussed above the width of the free end face of the axially innermost sealing lip can be increased as desired, the groove or grooves can easily be formed therein.

In a further preferred embodiment of the present invention, the sealing contact member may be of a generally L-sectioned configuration including a cylindrical wall and an radially upright wall protruding radially outwardly from the cylindrical wall. In such case, the innermost sealing lip confronts a first portion of the sealing surface defined in an outer peripheral surface of the cylindrical wall and at least one of the remaining elastic sealing lips is held in sliding contact with a second portion of the sealing surface defined on one of opposite surfaces of the radially upright wall that confronts the sealing member. The use of the generally L-sectioned sealing contact member is effective to assuredly avoid any undesirable ingress of dust and muddy water and, therefore, the axially innermost sealing lip need not have a function of avoiding an undesirable ingress of dust and muddy water from outside into the annular working space. This means that the axially innermost sealing lip functioning as the non-contact sealing lip has no concern with any problem associated with reduction in effect of avoiding ingress of dust and muddy water.

In a still further preferred embodiment of the present invention, the wheel support bearing assembly may further include a ring-shaped multi-pole magnet secured to the sealing contact member. This multi-pole magnet is magnetized to have a plurality of opposite magnetic poles alternating with each other in a direction circumferentially thereof. This multi-pole magnet can cooperate with a sensor, which may be positioned in face-to-face relation with the multi-pole magnet, to define a rotation detecting device for detecting the number of revolutions of the rotating element, for example, the vehicle wheel. Since in this preferred embodiment the multi-pole magnet is merely rigidly connected to the sealing contact member, no extra and separate multi-pole magnet needs be fitted to the wheel support bearing assembly.

In a still further preferred embodiment of the present invention, a flange may be formed at one end of the inner member so as to extend radially outwardly beyond an outer periphery of a cylindrical portion of the outer member and, in this case, the sealing member is used to seal one of the opposite open ends of the annular working space adjacent such flange. By way of example, the inner member may be of a structure including a hub axle having a wheel mounting flange formed therein. Although in the vicinity of the flange the sealing surface defined in a portion of the outer peripheral surface of the inner member represents an inclined or curved surface, the effect of reducing the frictional resistance and the effect of avoiding an undesirable leakage of the filled lubricant, both afforded by the use of the axially innermost sealing lip functioning as the non-contact sealing lip, can advantageously be secured even at such sealing surface of an inclined or curved configuration.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
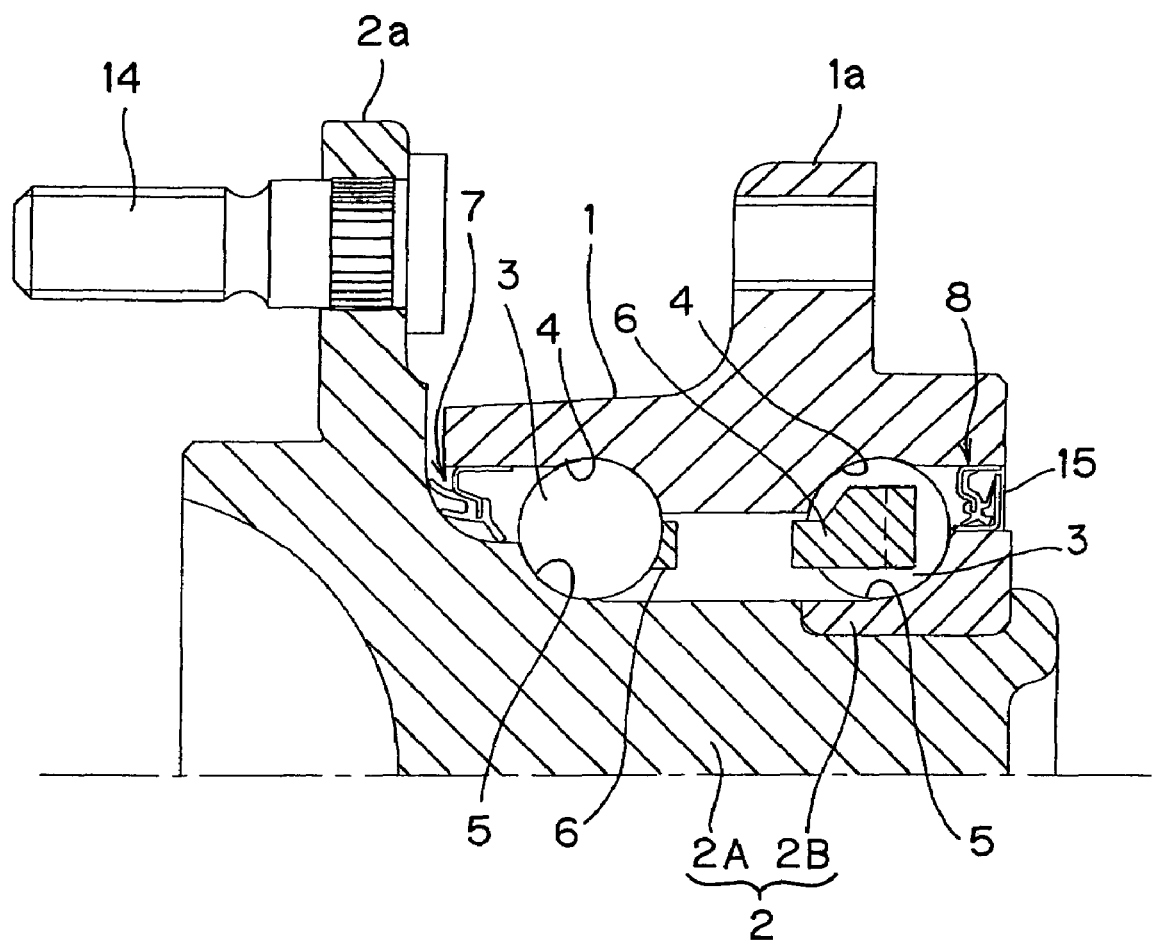
FIG. 1 is a longitudinal sectional view of a wheel support bearing assembly according to a first preferred embodiment of the present invention.

A first preferred embodiment of the present invention will be described with particular reference to FIGS. 1 to 6. This embodiment is directed to a wheel support bearing assembly of an inner race rotating type that is used to support a driven wheel and which is classified as a third generation bearing assembly. The wheel support bearing assembly shown therein includes a generally cylindrical outer member 1 having an inner peripheral surface formed with a plurality of, for example, two, outer raceways 4 defined therein, a generally cylindrical inner member 2 having an outer surface formed with mating inner raceways 5 defined therein and positioned substantially in face-to-face relation with the outer raceways 4 and circumferentially extending rows of rolling elements 3 rollingly accommodated in part in the outer raceways 4 and in part in the inner raceways 5, respectively. The outer member 1 is positioned radially outwardly of the inner member 2 and defines an annular working space between it and the inner member 2. The rolling elements 3 of each row are employed in the form of balls and are operatively retained in and by a retainer or cage 6.

The illustrated wheel support bearing assembly of the structure discussed above is an angular contact ball bearing and the raceways 4 and 5 in the outer and inner members 1 and 2 represent a circumferentially extending arcuate groove. The outer and inner raceways 4 and 5 are so positioned on respective sides of the corresponding row of the rolling elements 3 opposite to each other as to permit the contact angles θ to be formed at a position between the rows of the rolling elements 3 and radially outwardly thereof.

In the illustrated embodiment, the outer member 1 serves as a stationary or non-rotatable member and includes a vehicle wall fitting flange 1a formed integrally therewith so as to extend radially outwardly therefrom. On the other hand, the inner member 2 serves as a movable or rotatable member and includes a hub axle 2A, formed integrally with a radially outwardly extending wheel mounting flange 2a, and an inner race forming member 2B fixedly mounted on an inboard end of the hub axle 2A. The two inner raceways 5 are defined in the hub axle 2A and the inner race forming member 2B, respectively, as clearly shown in FIG. 1.

The wheel mounting flange 2a is positioned on an outboard end of the inner member 2 and is formed integrally with the inner member 2 so as to extend radially outwardly beyond an outer peripheral surface of a cylindrical portion of the outer member 1. A wheel (not shown) is secured to the wheel mounting flange 2a by means of a plurality of set bolts 14. On the other hand, the inner race forming member 2B is fixedly mounted on the hub axle 2A by means of a crimped portion of an inboard end of the hub axle 2A after having been axially mounted onto the hub axle 2A. Opposite open ends of the annular working space delimited between the inner and outer members 2 and 1 are sealed by respective outboard and inboard sealing members 7 and 8 each having a plurality of elastic sealing lips as will be subsequently described in detail.

Figure 2A:
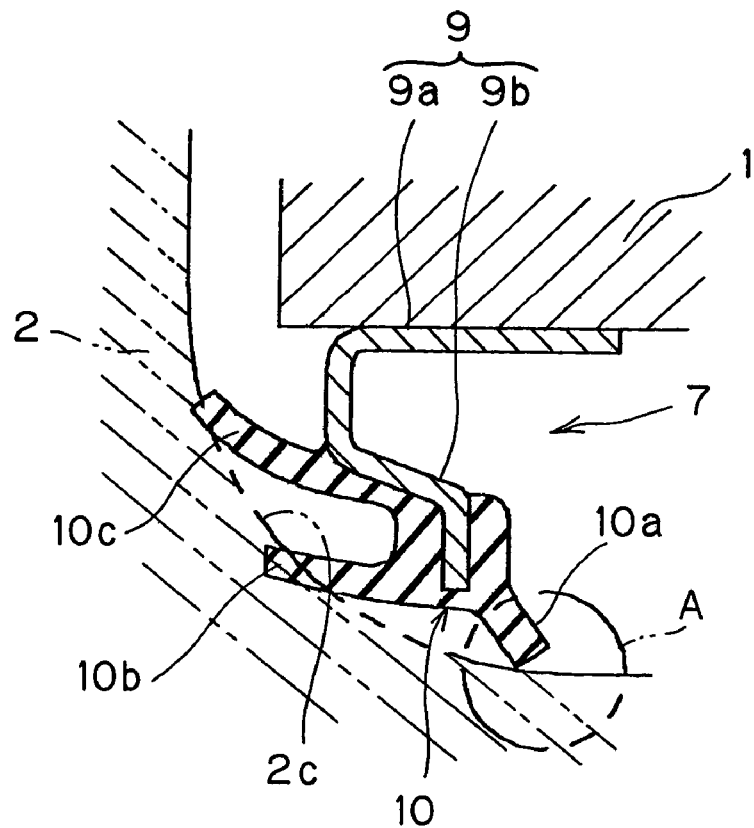
FIG. 2A is a longitudinal sectional view, on an enlarged scale, of a portion of the wheel support bearing assembly, showing an outboard sealing member used therein.

As shown on an enlarged scale in FIG. 2A, the outboard sealing member 7 includes a generally L-sectioned annular core metal 9 having a cylindrical wall 9a and a radially upright wall 9b extending radially inwardly from the cylindrical wall 9a so as to lie substantially perpendicular to the cylindrical wall 9a, and an elastic member 10 fixedly connected to the core metal 9. The outboard sealing member 7 is fixed to the outer member 1 with the cylindrical wall 9a of the core metal 9 press-fitted into the inner peripheral surface of the outer member 1. The elastic member 10 is formed with a plurality of, for example, three elastic sealing lips 10a, 10b and 10c which extend outwardly therefrom towards a sealing surface area 2c that forms a part of the outer peripheral surface of the inner member 2 adjacent the wheel mounting flange 2a. Of those elastic sealing lips, the elastic sealing lip 10a is positioned generally axially inwardly of the radially upright wall 9b of the core metal 9 with respect to the annular working space whereas the elastic sealing lips 10b and 10c are positioned axially outwardly of the radially upright wall 9b of the core metal 9 with respect to the annular working space. In other words, the elastic sealing lip 10a is so formed as to extend generally axially inwardly in a direction towards the annular working space with its free end positioned in the vicinity of the sealing surface area 2c, as will be detailed subsequently, whereas the elastic sealing lips 10b and 10c are so formed as to extend axially outwardly in a direction counter to the annular working space with their respective free ends held in sliding contact with the sealing surface area 2c.

Figure 2B:
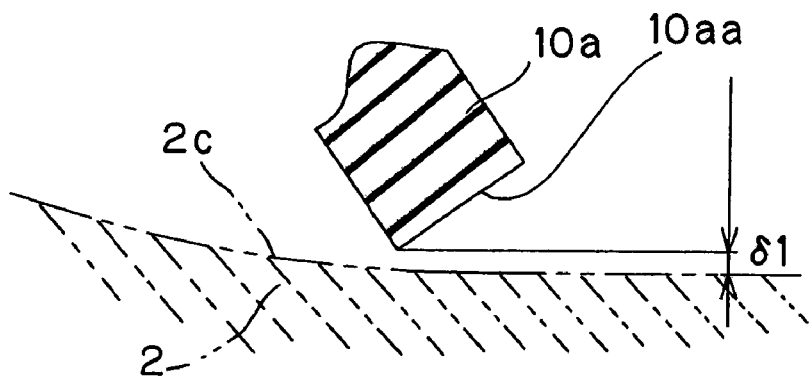
FIG. 2B is a diagram showing a portion of the outboard sealing member, encompassed by the circle A in FIG. 2A, on a further enlarged scale.

As best shown in FIG. 2B on an enlarged scale, the elastic sealing lip 10a has its free end terminating at a location spaced a distance $\delta 1$ radially outwardly from the sealing surface area 2c and, accordingly, this elastic sealing lip 10a serves as a non-contact elastic sealing lip in the presence of a gap represented by the distance $\delta 1$. As a matter of design, separation of the free end of the elastic sealing lip 10a from the sealing surface area 2a by the distance $\delta 1$ lies in a radial direction, and the gap represented by the distance $\delta 1$ is of a size so chosen as to permit flow of air therethrough and, also, as to provide a non-contact sealing effect when a relative rotation takes place between the outer and inner members 1 and 2. The free end of the elastic sealing lip 10a has a free end face 10aa which represents such a tapering or curved face as to allow the distance $\delta 1$, that is, the size of the gap to gradually increase in a direction away from the sealing surface area 2c and inwardly of the annular working space. It is to be noted that although in FIG. 2B the distance $\delta 1$ is shown as a minimum distance attained between a point of the free end face 10aa of the elastic sealing lip 10a and the sealing surface area 2c, the gap represented by this distance $\delta 1$ is to be understood as meaning the entire space of separation delimited between the free end face 10aa of the elastic sealing lip 10a and the sealing surface area 2c.

Figure 3A:
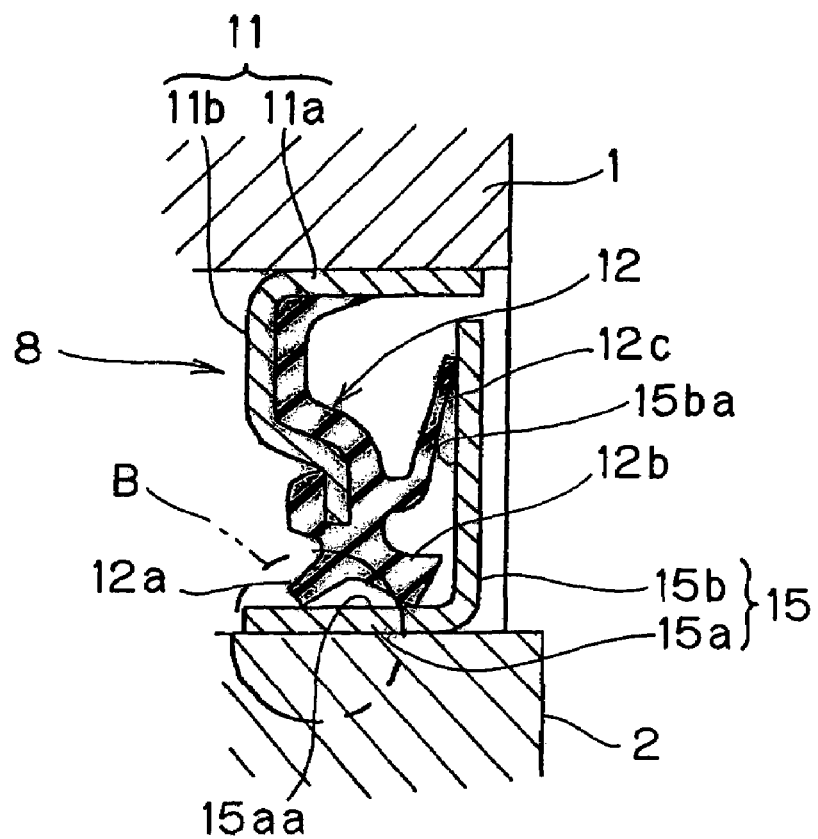
FIG. 3A is a longitudinal sectional view, on an enlarged scale, of another portion of the wheel support bearing assembly, showing an inboard sealing member used therein.

On the other hand, as shown in FIG. 3A, the inboard sealing member 8 includes a generally L-sectioned annular core metal 11 having a cylindrical wall 11a and a radially upright wall 11b extending radially inwardly from the cylindrical wall 11a so as to lie generally perpendicular to the cylindrical wall 11a, and an elastic member 12 fixedly connected to the core metal 11. The outboard sealing member 8 is fixed to the outer member 1 with the cylindrical wall 11a of the core metal 11 press-fitted into the inner peripheral surface of the outer member 1. Cooperative with this inboard sealing member 8 is a generally L-sectioned annular sealing contact member 15 mounted on the inner member 2 and serving as a slinger. Specifically, this L-sectioned annular sealing contact member 15 includes a cylindrical wall 15a and a radially upright wall 15b extending radially outwardly from the cylindrical wall 15a so as to lie substantially perpendicular to the cylindrical wall 15a with the cylindrical wall 15a press-fitted onto the inner member 2. As will become clear from the subsequent description, one of opposite surfaces of the cylindrical wall 15a of the annular sealing contact member 15 remote from the inner member 2 and one of opposite surface of the radially upright wall 15b of the annular sealing contact member 15 adjacent the elastic member 12 define respective flat sealing surface areas 15aa and 15ba.

The elastic member 12 of the inboard sealing member 8 is formed with a plurality of, for example, three elastic sealing lips 12a, 12b and 12c which extend outwardly therefrom towards the flat sealing surface areas 15aa and 15ba of the L-sectioned sealing contact member 15. Of those elastic sealing lips of the elastic member 12, the elastic sealing lip 12a is positioned generally axially inwardly of the radially upright wall 11b of the core metal 11 with respect to the annular working space whereas the elastic sealing lips 12b and 12c are positioned axially outwardly of the radially upright wall 11b of the core metal 11 with respect to the annular working space so as to be held in sliding contact with the respective flat sealing surface areas 15aa and 15ba.

Figure 3B:
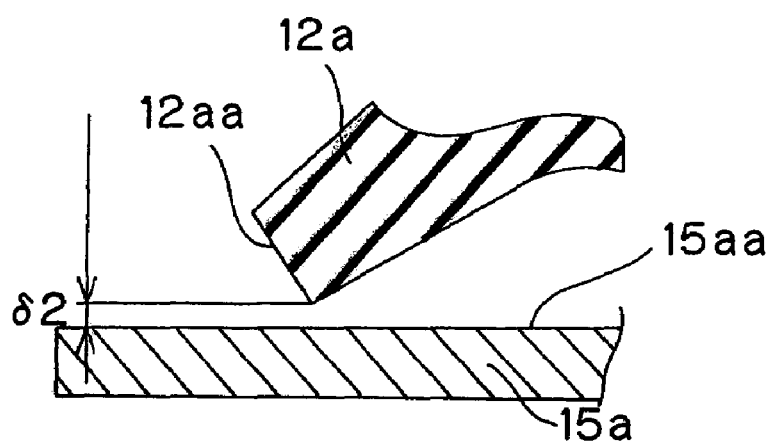
FIG. 3B is a diagram showing a portion of the inboard sealing member, encompassed by the circle B in FIG. 3A, on a further enlarged scale.

Specifically, as best shown in FIG. 3B on an enlarged scale, the elastic sealing lip 12a is so formed as to extend generally axially inwardly in a direction towards the annular working space with its free end terminating at a location spaced a distance $\delta 2$ radially outwardly from the flat sealing surface area 15aa and, accordingly, this elastic sealing lip 12a serves as a non-contact elastic sealing lip in the presence of a gap represented by the distance $\delta 2$. The gap represented by the distance $\delta 2$ is of a size so chosen as to permit flow of air therethrough and, also, as to provide a non-contact sealing effect when a relative rotation takes place between the outer and inner members 1 and 2. As a matter of design, separation of the free end of the elastic sealing lip 12a from the sealing surface area 15aa by the distance $\delta 2$ lies in a radial direction.

As is the case with the free end of the elastic sealing lip 10a of the outboard sealing member 7 discussed with reference to FIG. 2B, the free end of the elastic sealing lip 12a has a free end face 12aa which represents such a tapering or curved face as to allow the distance $\delta 2$, that is, the size of the gap to gradually increase in a direction away from the sealing surface area 15aa and inwardly of the annular working space. It is to be noted that although even in FIG. 3B the distance $\delta 2$ is shown as a minimum distance attained between a point of the free end face 12aa of the elastic sealing lip 12a and the sealing surface area 15aa, the gap represented by this distance $\delta 2$ is to be understood as meaning the entire space of separation delimited between the free end face 12aa of the elastic sealing lip 12a and the sealing surface area 15aa.

In the wheel support bearing assembly utilizing the outboard and inboard sealing members 7 and 8 of the respective structures discussed above in detail, since the axially innermost elastic sealing lip 10a of the outboard sealing member 7 defines the non-contact elastic sealing lip, no frictional resistance is involved in this elastic sealing lip 10a and, accordingly, the possibility of a loss of torque which would otherwise occur in the outboard sealing member 7 can advantageously be reduced. Although the axially innermost elastic sealing lip 10a which is used to prevent a lubricant, filled inside the annular working space, from leaking functions as the non-contact elastic sealing lip, if the gap, that is, the distance $\delta 1$ is small to a certain extent, it can prevent the viscous lubricant such as a grease from leaking through such.

Also, since the axially innermost elastic sealing lip 10a functions as the non-contact elastic sealing lip, air inside the annular working space can be purged to the outside through the gap even when thermally expanded by the effect of heat evolved during the operation of the wheel support bearing assembly. Accordingly, there is no possibility that the axially innermost elastic sealing lip 10a may be urged to contact the sealing surface area 2c by the effect of the pressure of air so expanded thermally and, hence, no increase of the frictional resistance takes place in anyway whatsoever. With respect to an undesirable ingress of dust and muddy water from the outside into the annular working space, the other contact-type elastic sealing lips 10b and 10c serve the purpose.

The inboard sealing member 8 functions in a manner similar to and brings effects similar to the outboard sealing member 7 discussed above. More specifically, in the inboard sealing member 8, since the axially innermost elastic sealing lip 12a defines the non-contact elastic sealing lip, no frictional resistance is involved in this elastic sealing lip 12a and, accordingly, the possibility of a loss of torque which would otherwise occur in the inboard sealing member 8 can advantageously be reduced. Although the axially innermost elastic sealing lip 12a which is used to prevent a lubricant, filled inside the annular working space, from leaking functions as the non-contact elastic sealing lip, if the gap, that is, the distance $\delta 2$ is small to a certain extent, yet it can prevent the viscous lubricant such as a grease from leaking through such gap.

Also, since the axially innermost elastic sealing lip 12a functions as the non-contact elastic sealing lip, air inside the annular working space can be purged to the outside through the gap even when thermally expanded by the effect of heat evolved during the operation of the wheel support bearing assembly. Accordingly, there is no possibility that the axially innermost elastic sealing lip 12a may be urged to contact the sealing surface area 15aa by the effect of the pressure of air so expanded thermally and, hence, no increase of the frictional resistance takes place in anyway whatsoever. With respect to an undesirable ingress of dust and muddy water from the outside into the annular working space, the other contact-type elastic sealing lips 12b and 12c serve the purpose.

It is to be noted that although the grease filled in the annular working space between the outer and inner members 1 and 2 is generally injected from a sealed side, leakage of the grease would take place hardly if the grease is injected into the annular working space through an injection port (not shown) defined in, for example, the outer member 1 so as to flow in between the rows of the balls 3.

In the foregoing embodiment of the present invention, the elastic sealing lips 10a and 12a of the outboard and inboard sealing members 7 and 8 serves as a non-contact elastic sealing lip as hereinbefore discussed and, therefore, the respective shapes of the free ends of those elastic sealing lips 10a and 12a do in no way affect the frictional resistance, that is, no frictional resistance is virtually brought about between those elastic sealing lips 10a and 12a and the sealing surface areas. Accordingly, the respective free ends of those elastic sealing lips 10a and 12a may have a thickness either more increased or more reduced.

Figure 4A:
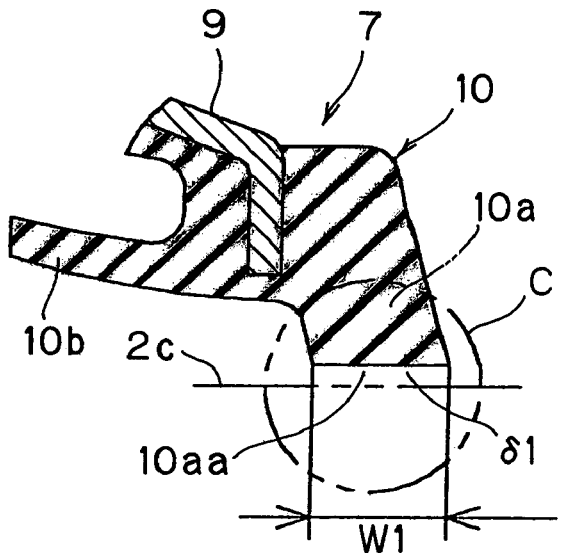
FIG. 4A is a diagram similar to FIG. 2A, showing a modified form of the outboard sealing member.

By way of example, as shown in FIG. 4A, the free end of the elastic sealing lip 10a has its end face 10aa of a width W1, as measured in a direction across the thickness thereof, that is greater than the width of a similar end face of the free end of any one of the other elastic sealing lips 10b and 10c. Similarly, the free end of the elastic sealing lip 12a has its end face 12aa of a width W2, as measured in a direction across the thickness thereof, that is greater than the width of a similar end face of the free end of any one of the other elastic sealing lips 12b and 12c as shown in FIG. 4B.

Figure 4B:
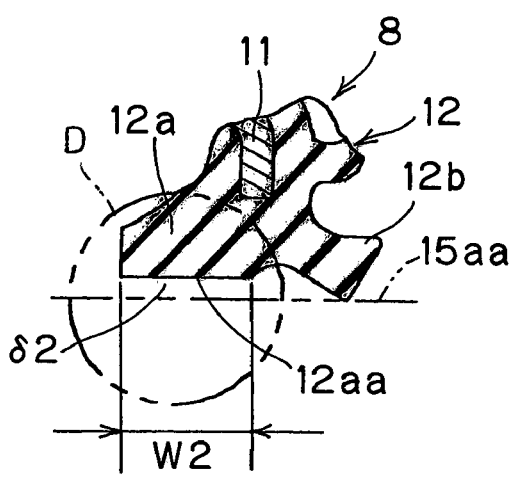
FIG. 4B is a diagram similar to FIG. 3A, showing a modified form of the inboard sealing member.
Figure 5A:
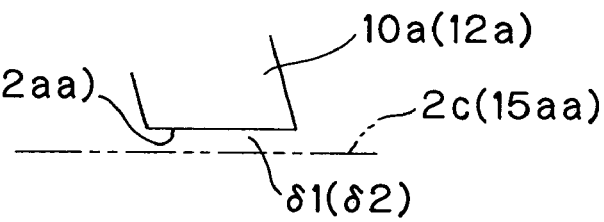
FIGS. 5A to 5D are schematic diagrams showing different shapes of a slide contact surface of any one of the outboard and inboard sealing members, respectively.

Also, as shown in FIG. 5A showing on an enlarged scale a portion of each of the free ends of the respective elastic sealing lips 10a and 12a, that is encompassed by the circle C or D in FIG. 4A or 4B, the free end face 10aa or 12aa is so shaped as to be flat. However, where the width W1 or W2 of the free end face 10aa or 12aa, respectively, is increased to a value greater than the width of a similar end face of the free end of any one of the other elastic sealing lips 10b and 10c or 12b and 12c, the respective end face 10aa or 12aa may be grooved as indicated by 16A, 16B or 16C in FIGS. 5B, 5C and 5D, respectively.

Figure 5B:
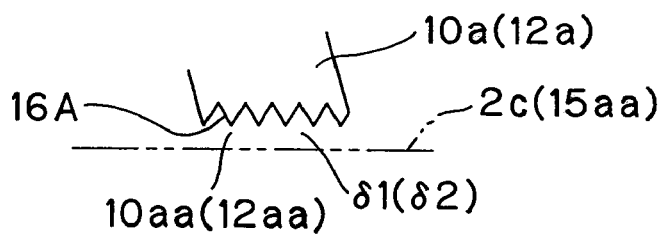
Figure 5C:
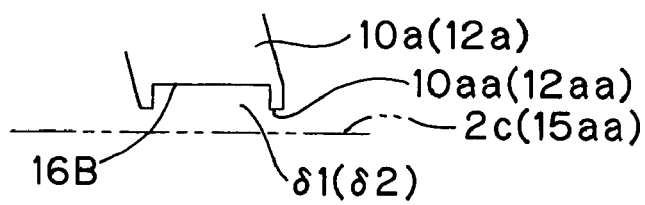
Figure 5D:
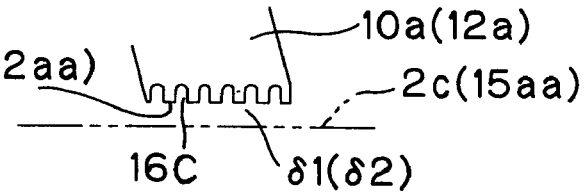

More specifically, in the example shown in FIG. 5B, the free end face 10aa or 12aa is formed with a plurality of circumferentially extending parallel grooves 16A which are generally V-shaped grooves substantially adjoining with each other over the entire width of the free end face 10aa or 12aa. In the example shown in FIG. 5D, the free end face 10aa or 12aa is formed with a plurality of circumferentially extending parallel grooves 16C which are juxtaposed over the entire width of the free end face 10aa or 12aa and which may be generally U-shaped grooves. In the example shown in FIG. 5C, the free end face 10aa or 12aa is formed with a single circumferentially extending groove 16B which occupies a major portion of the width W1 or W2.

Where the free end face 10aa or 12aa of the respective elastic sealing lip 10a or 12a is grooved, the gap represented by the corresponding distance $\delta 1$ or $\delta 2$ discussed previously with reference to FIG. 2B or FIG. 3B defines a labyrinth seal structure with the sealability increased consequently. Also, where the plural circumferential grooves are employed on the free end face 10aa or 12aa such as shown by 16A and 16C in FIGS. 5B and 5D, respectively, the gap represented by the corresponding distance $\delta 1$ or $\delta 2$ provides a more complicated labyrinth seal structure with the sealability further increased consequently.

Figure 6:
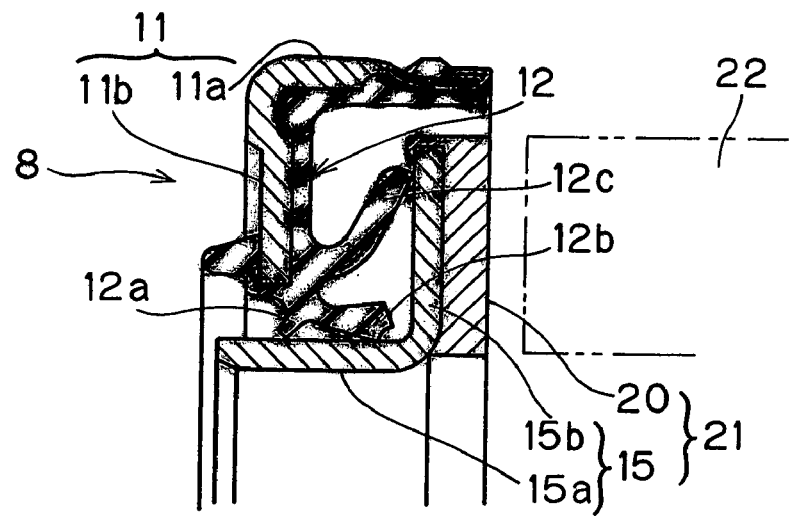
FIG. 6 is a fragmentary longitudinal sectional view showing a further modified form of the inboard sealing member.

FIG. 6 illustrates a modification of the inboard sealing member 8. In this modification, a ring-shaped multi-pole magnet 20 is fixedly connected to a flat surface of the radially upright wall 15b of the annular sealing contact member 15 that is opposite to the flat sealing surface area 15ba and that is oriented in a direction axially outwardly of the annular working space between the outer and inner members 1 and 2. This multi-pole magnet 20 has a plurality of opposite magnetic poles defined thereon so as to alternate in a direction circumferentially thereof and cooperates with the sealing contact member 15 to define an magnetic encoder 21. The multi-pole magnet 20 may be in the form of, for example, a rubber magnet, a plastic magnet or a sintered magnet, in which a powder of magnetic material is mixed, The magnetic encoder 21 cooperates with a sensor 22, so positioned as to confront the multi-pole magnet 20 in a direction axially of the bearing assembly, to provide a compact rotation detecting device for detecting the number of revolutions of the rotating element, that is, the inner member 2 and, thus, the vehicle wheel.

FIGS. 7 to 11 illustrates different embodiments of the present invention, respectively. Those embodiments shown in FIGS. 7 to 11, respectively, are all directed to the wheel support bearing assembly of a generation different from that of the wheel support bearing assembly according to the first embodiment. Even the wheel support bearing assembly according to any of those different embodiments is of a design employed for rotatably supporting the vehicle wheel relative to the vehicle body structure and similarly includes, as is the case with that according to the first embodiment, the generally cylindrical outer member 1 having an inner peripheral surface formed with a plurality of, for example, two, outer raceways 4 defined therein, the generally cylindrical inner member 2 having an outer surface formed with the mating inner raceways 5 defined therein and positioned substantially in face-to-face relation with the outer raceways 4 and circumferentially extending rows of the rolling elements 3 rollingly accommodated in part in the outer raceways 4 and in part in the inner raceways 5, respectively. Accordingly, unless otherwise specified, the wheel support bearing assembly according to any of those different embodiments is of a structure substantially similar to that shown and described in connection with the first embodiment.

Figure 7:
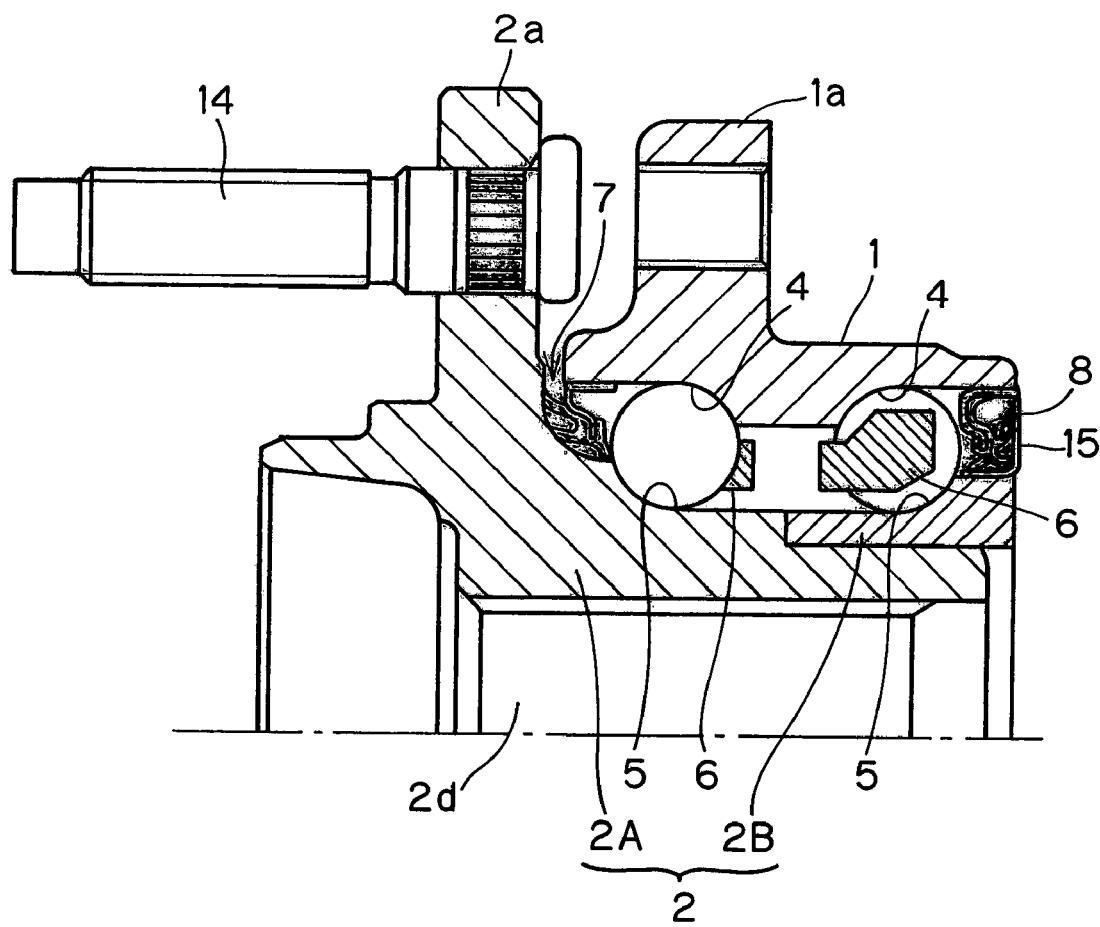
FIG. 7 is a longitudinal sectional view of the wheel support bearing assembly according to a second preferred embodiment of the present invention.

Referring specifically to FIG. 7 showing the second preferred embodiment of the present invention, the wheel support bearing assembly shown therein is of an inner race rotating type of a third generation and is used to rotatably support a drive wheel. Since the wheel support bearing assembly shown in FIG. 7 is of a design employed for rotatably supporting the drive wheel, the second embodiment differs from the first embodiment in that the hub axle 2A forming a part of the inner member 2 has an axial bore 2d defined therein for fixedly receiving therein a shank of a constant velocity universal joint (not shown). However, the provision of the outboard and inboard sealing members 7 and 8 for sealing the opposite open ends of the annular working space between the inner and outer members 2 and 1, respectively, the specific structure of each of those outboard and inboard sealing members 7 and 8 and other structural features of the wheel support bearing assembly of FIG. 7 are all substantially similar to those shown and described in connection with the first embodiment.

Figure 8:
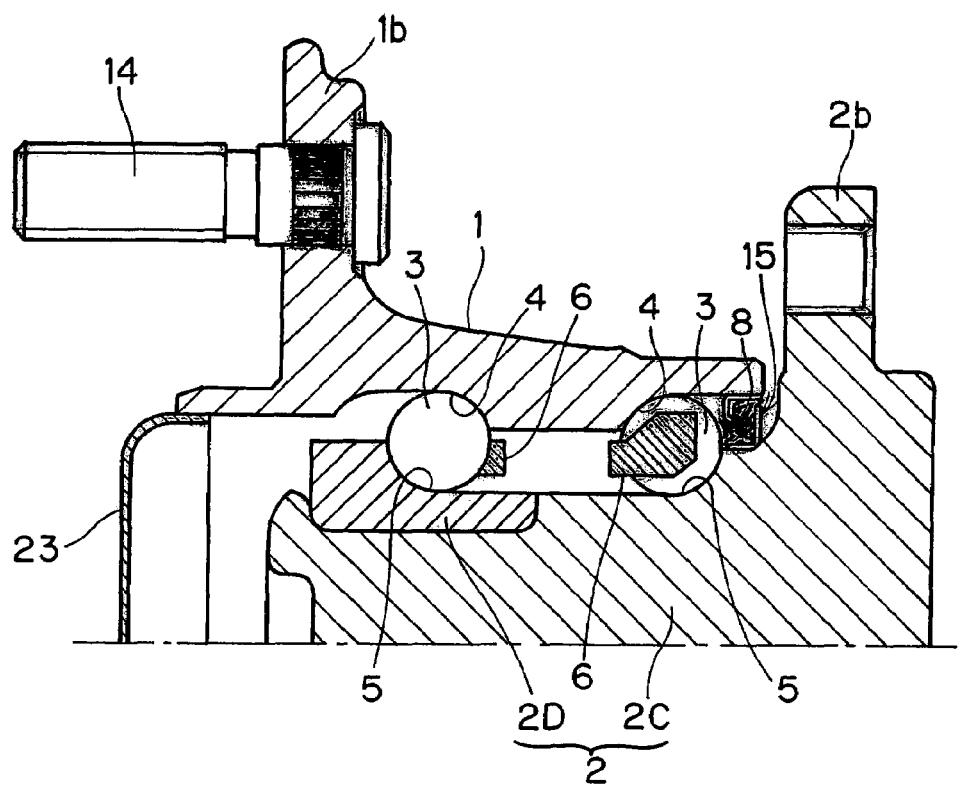
FIG. 8 is a longitudinal sectional view of the wheel support bearing assembly according to a third preferred embodiment of the present invention.

FIG. 8 illustrates the wheel support bearing assembly according to the third embodiment of the present invention, which is an outer race rotating type of a third generation and is of a design employed for rotatably supporting the driven wheel. In this embodiment of FIG. 8, the wheel mounting flange 1b is formed integrally with the outer member 1, and the inner member 2 employed therein is made up of a first inner race forming member 2C, formed integrally with the vehicle body fitting flange 2b and having a first inner raceway 5 defined therein, and a second inner race forming member 2D having a second inner raceway 5 defined therein. The outboard open end of the outer member 1 is covered by a cap member 23. Because of the presence of the cap member 23, no outboard sealing member such as employed in and identified by 7 in any one of the foregoing embodiments is employed, and only the inboard sealing member 8 with sealing lips is employed. The structure of the inboard sealing member 8 and other structural features of the wheel support bearing assembly shown in FIG. 8 are similar to those shown and described in connection with the first embodiment.

Figure 9:
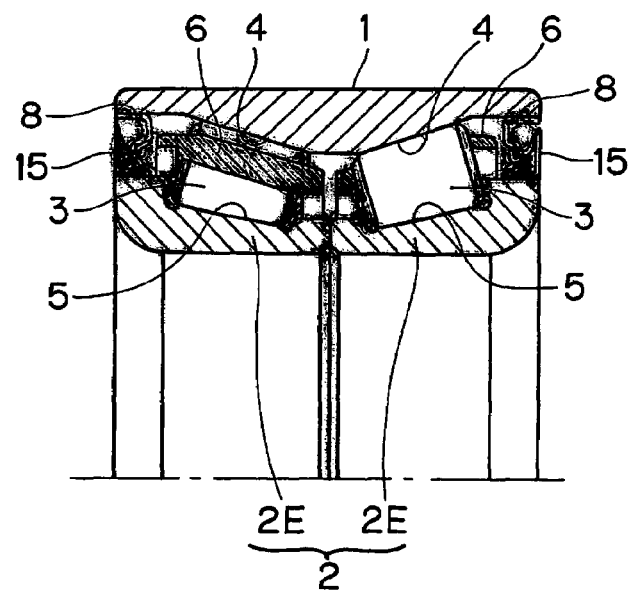
FIG. 9 is a longitudinal sectional view of the wheel support bearing assembly according to a fourth preferred embodiment of the present invention.

FIG. 9 illustrates the fourth embodiment of the present invention which is directed to the wheel support bearing assembly of a first generation. This wheel support bearing assembly includes the outer member 1 having its inner peripheral surface formed with a plurality of, for example, two, grooved outer raceways 4 defined therein, the inner member 2 having its outer peripheral surface formed with grooved inner raceways 5 defined therein and located in face-to-face relation with the respective grooved outer raceways 4, and corresponding rows of the rolling elements 3 received in part within the grooved outer raceways 4 and in part within the grooved inner raceways 5 within the annular working space between the inner and outer members 2 and 1. The inner member 2 employed therein is of an axially split type including outboard and inboard inner races 2E connected coaxially with each other. The rolling elements are in the form of a tapered roller and are retained in each row by a retainer 6.

The opposite open ends of the annular working space delimited between the inner and outer members 2 and 1 are sealed by outboard and inboard sealing members 8A and 8B in combination with associated sealing contact members 15A and 15B. Each of the outboard and inboard sealing members 8A and 8B, as well as the associated sealing contact member 15A and 15B, is of a structure similar to or substantially identical with the inboard sealing member 8 and the sealing contact member 15 employed in the wheel support bearing assembly according to any one of the first to third embodiments and, therefore, the details thereof are not reiterated for the sake of brevity.

Figure 10:
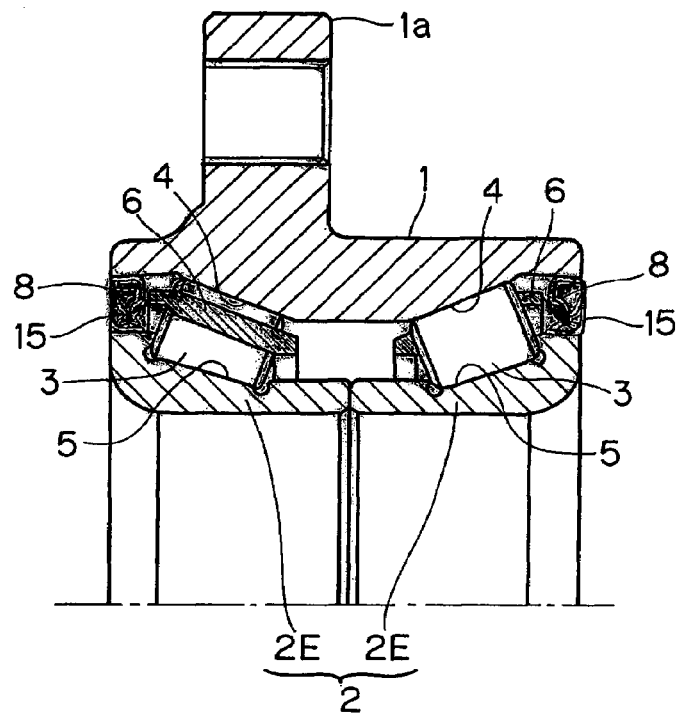
FIG. 10 is a longitudinal sectional view of the wheel support bearing assembly according to a fifth preferred embodiment of the present invention.

The fifth preferred embodiment of the present invention is shown in FIG. 10. The wheel support bearing assembly shown therein is of an inner race rotating type of the second generation and is of a design employed for rotatably supporting the driven wheel. In this embodiment, the outer member 1 has the vehicle body mounting flange 1a formed therein. Other structural features of the wheel support bearing assembly shown in FIG. 10 are similar to those according to the fourth embodiment shown in and described with reference to FIG. 9 and, therefore, the details thereof are not reiterated for the sake of brevity.

Figure 11:
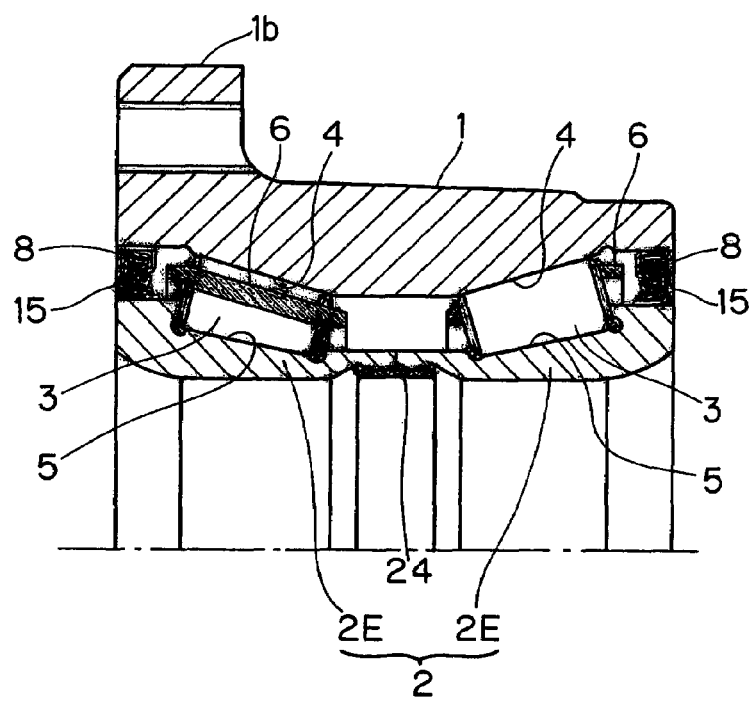
FIG. 11 is a longitudinal sectional view of the wheel support bearing assembly according to a sixth preferred embodiment of the present invention.
Figure 12:
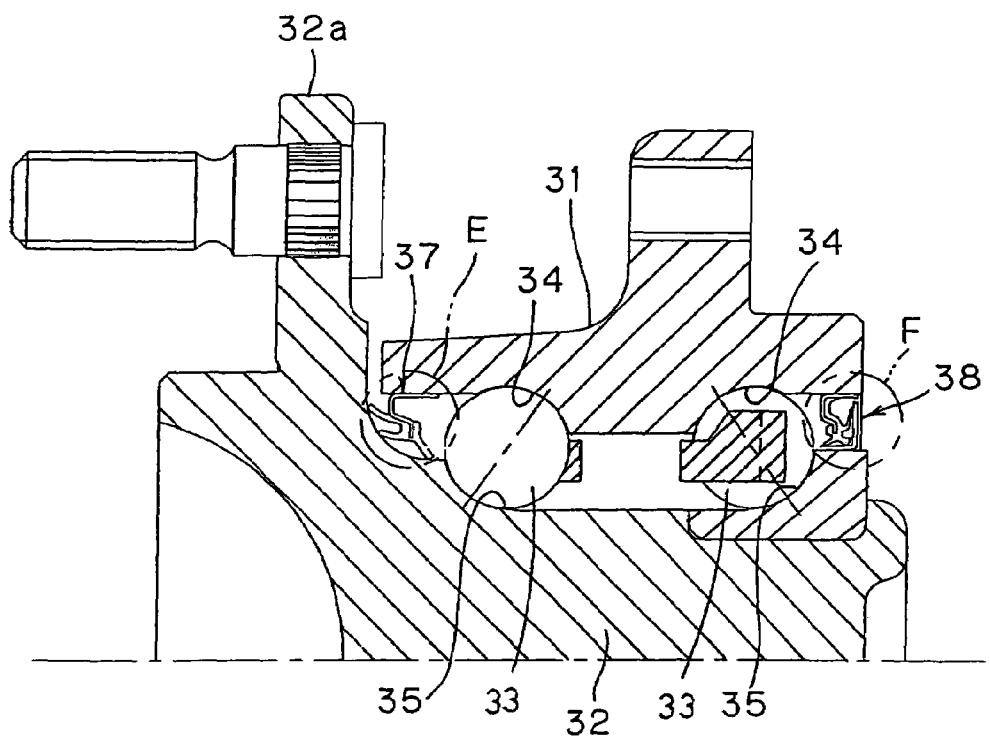
FIG. 12 is a longitudinal sectional view of the conventional wheel support bearing assembly, showing only the upper half of such bearing assembly.
Figure 13A:
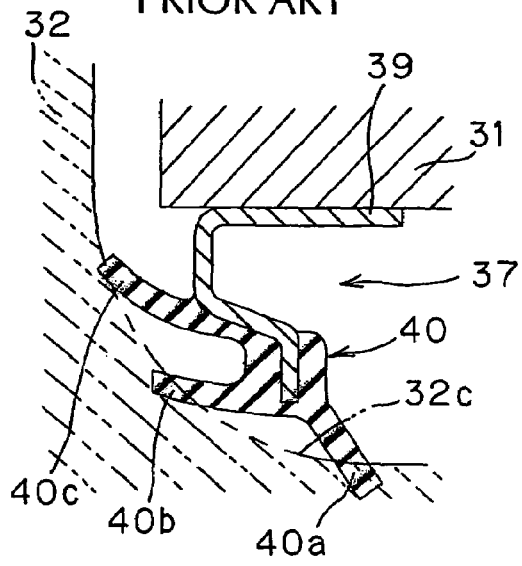
FIG. 13A is a longitudinal sectional view, on an enlarged scale, of a portion of the conventional wheel support bearing assembly, showing the outboard sealing member used therein.
Figure 13B:
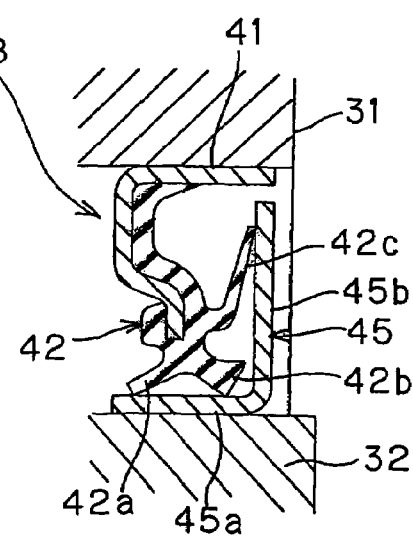
FIG. 13B is a longitudinal sectional view, on an enlarged scale, of another portion of the conventional wheel support bearing assembly, showing the inboard sealing member used therein.

In the sixth preferred embodiment shown in FIG. 11, the wheel support bearing assembly is of an outer race rotating type of the second generation and is of a design employed for rotatably supporting the driven wheel. According to this embodiment, the outer member 1 has the wheel mounting flange 1b formed therein. The inner member 2 is similarly of an axially split type including outboard and inboard inner races 2E connected coaxially with each other by means of a connecting ring 24. Other structural features of the wheel support bearing assembly shown in FIG. 11 are similar to those according to the fourth embodiment shown in and described with reference to FIG. 9 and, therefore, the details thereof are not reiterated for the sake of brevity.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, the present invention can be equally applied to any wheel support bearing assembly regardless of the specific type of the rolling elements 3 employed therein. More specifically, although the wheel support bearing assembly according to any one of the foregoing embodiments of the present invention has been described and shown as an angular contact ball bearing, the present invention can be equally applied to a tapered roller bearing and, conversely, the present invention when applied to the tapered roller bearing can be equally applied to the angular contact ball bearing.

Accordingly, such changes and modifications are, unless they depart from the scope of the present invention as delivered from the claims annexed hereto, to be construed as included therein.

What is claimed is:

1. A wheel support bearing assembly, comprising:
   an outer member having an inner peripheral surface formed with a plurality of outer raceways;
   an inner member positioned inside the outer member with an annular working space defined between it and the outer member, said inner member having an outer peripheral surface formed with inner raceways in mating relation with the respective outer raceways in the outer member;
   rows of rolling elements accommodated within the annular working space and rollingly received in part within the outer raceways in the outer member and in part within the inner raceways in the inner member; and
   at least one sealing member fitted to one of the inner and outer members sealing one of opposite open ends of the annular working space delimited between the inner and outer members, said sealing member having an approximately uniform annular cross section and a plurality of elastic sealing lips which extend towards a sealing surface defined directly on the other of the inner and outer members or defined on a sealing contact member fitted to the other of the inner and outer members, one of said elastic sealing lips extending in a direction generally axially inwardly of the annular working space and defining an axially innermost sealing lip while the other elastic sealing lips being kept in sliding contact with the sealing surface;
   wherein the innermost sealing lip is a non-contact sealing lip leaving a gap between a free end thereof and the sealing surface of the sealing contact member, a size of the entire gap gradually increases in a direction away from the sealing surface area and inwardly of the annular working space, said gap being of a size sufficient to
      permit flow of air therethrough, and
      prevent a lubricant from passing therethrough and to provide a non-contact sealing effect when a relative rotation takes place between the outer and inner members.

2. The wheel support bearing assembly as claimed in claim 1, wherein the at least one sealing member includes a core metal and an elastic member rigidly mounted on the core metal and wherein all of the elastic sealing lips are an integral part of the elastic member.

3. The wheel support bearing assembly as claimed in claim 1, wherein the gap is defined in a radial direction between a free end face of the axially innermost sealing lip and the sealing surface.

4. The wheel support bearing assembly as claimed in claim 3, wherein the free end of the axially innermost sealing lip extends inwardly of the annular working space between the inner and outer members.

5. The wheel support bearing assembly as claimed in claim 1, wherein the free end face of the axially innermost sealing lip which confronts the sealing surface has a width, as measured in a direction across a thickness of the axially innermost sealing lip, which is greater than that of any one of the remaining elastic sealing lips.

6. The wheel support bearing assembly as claimed in claim 1, wherein the sealing contact member includes a cylindrical wall and an radially upright wall protruding radially outwardly from the cylindrical wall so as to render the sealing contact member to represent a generally L-sectioned configuration, and wherein the innermost elastic sealing lip confronts a first portion of the sealing surface defined on an outer peripheral surface of the cylindrical wall and at least one of the remaining elastic sealing lips is held in sliding contact with a second portion of the sealing surface defined on the radially upright wall that confronts the sealing member.

7. The wheel support bearing assembly as claimed in claim 1, further comprising a ring-shaped multi-pole magnet secured to the sealing contact member, said multi-pole magnet magnetized to have a plurality of opposite magnetic poles alternating with each other in a direction circumferentially thereof.

8. The wheel support bearing assembly as claimed in claim 1, wherein the inner member has one end formed with a flange which extends radially outwardly beyond a level of an outer periphery of a cylindrical portion of the outer member and wherein the sealing member is used to seal one of the opposite open ends of the annular working space adjacent such flange.

9. A wheel support bearing assembly, comprising:
   inner and outer members defining an annular working space therebetween, and accommodating lubricated rolling elements within the annular working space; and
   a sealing member fitted to one of the inner or outer members and sealing an open end of the annular working space, the sealing member having
      an approximately uniform annular cross section,
      at least one elastic sealing lip maintaining sliding contact with a sealing surface defined on the remaining one of the inner or outer members, or on a sealing contact member fitted to the remaining one of the inner or outer members, and
      an axially innermost elastic sealing lip extending axially inwardly of the annular working space and defining a gap between an end thereof and the sealing surface, a size of the entire gap gradually increasing in a direction away from the sealing surface and inwardly of the annular working space, the gap being sized to permit flow of air therethrough and provide a non-contact sealing effect to prevent a lubricant from exiting therethrough during relative rotation between the inner and outer members.

* * * * *

UNITED STATES PATENT AND TRADEMARK OFFICE
CERTIFICATE OF CORRECTION

PATENT NO. : 7,380,797 B2  Page 1 of 1
APPLICATION NO. : 10/621404
DATED : June 3, 2008
INVENTOR(S) : Sadaji Katogi et al.

It is certified that error appears in the above-identified patent and that said Letters Patent is hereby corrected as shown below:

On the Title Page, Item -57- (Abstract), Line 15, change "an" to --and--.

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

PATENT NO.       : 7,380,797 B2                                      Page 1 of 1
APPLICATION NO.  : 10/621404
DATED            : June 3, 2008
INVENTOR(S)      : Sadaji Katogi et al.

It is certified that error appears in the above-identified patent and that said Letters Patent is hereby corrected as shown below:

On the Title Page, Item (75) (Inventors), Line 2, change "Hiedeo" to --Hideo--.

Signed and Sealed this

Sixteenth Day of December, 2008

JON W. DUDAS
*Director of the United States Patent and Trademark Office*